(12) United States Patent
Vaganov

(10) Patent No.: US 6,590,697 B2
(45) Date of Patent: Jul. 8, 2003

(54) VOA WITH A MOVABLE FOCUSING MIRROR

(75) Inventor: Vladimir I. Vaganov, Los Gatos, CA (US)

(73) Assignee: Megasense, Sunnyvale, CA (US)

( * ) Notice: Subject to any disclaimer, the term of this patent is extended or adjusted under 35 U.S.C. 154(b) by 0 days.

(21) Appl. No.: 09/973,169

(22) Filed: Oct. 4, 2001

(65) Prior Publication Data

US 2003/0090776 A1 May 15, 2003

(51) Int. Cl.[7] .......................... G02B 26/00; G02B 27/10
(52) U.S. Cl. ..................... 359/296; 359/290; 359/627
(58) Field of Search ........................... 359/290, 291, 359/296, 626, 627, 814, 822, 824; 385/70, 71, 73

(56) References Cited

U.S. PATENT DOCUMENTS

| | | | | |
|---|---|---|---|---|
| 4,274,706 A | * | 6/1981 | Tangonan | 359/130 |
| 4,337,993 A | * | 7/1982 | Kompfner | 359/34 |
| 5,226,104 A | * | 7/1993 | Unterleitner et al. | 385/140 |
| 5,408,552 A | * | 4/1995 | Davenport et al. | 385/18 |
| 6,275,630 B1 | * | 8/2001 | Yang et al. | 359/130 |
| 6,411,751 B1 | * | 6/2002 | Giles et al. | 324/97 |
| 2002/0054422 A1 | * | 5/2002 | Carr et al. | 359/291 |

FOREIGN PATENT DOCUMENTS

| | | | | |
|---|---|---|---|---|
| EP | 1099972 A2 | * | 5/2001 | G02B/26/06 |
| GB | 2014751 A | * | 8/1979 | G02B/5/14 |

* cited by examiner

*Primary Examiner*—Ricky Mack
(74) *Attorney, Agent, or Firm*—Ian L. Cartier

(57) ABSTRACT

A variable optical attenuator, or VOA, includes a movable focusing mirror and an actuator integrated on a substrate or within a MEMS. The actuator moves the mirror within a range of motion to reflect, focus and steer a light beam. One embodiment further includes an input and an output photonic component, such as wave guides or optical fibers. The wave guides or optical fibers may have angled endfaces and be positioned to reduce the required operating range of motion of the mirror. The mirror may be a Fresnel mirror, a concave mirror, a diffractive mirror or a concave diffractive mirror. In certain embodiments the mirror is moved in at least two dimensions to steer the light beam to form a trajectory having at least two dimensions.

24 Claims, 6 Drawing Sheets

VOA WITH A MOVABLE FOCUSING MIRROR

FIELD OF THE INVENTION

The present invention relates generally to variable optical attenuation, and more particularly, to methods and devices for MEMS-based variable optical attenuation of optical signals.

BACKGROUND OF THE INVENTION

The wide application of variable optical attenuation of optical signals within optical communications networks insures that enhancements in variable optical attenuators and attenuation methods and capabilities can improve the field of optical network technology. Innovations that increase the performance qualities and lower the cost of manufacture of variable optical attenuators, or VOA's, are also of value to communications technologists.

The prior art has attempted to improve the devices and techniques of light beam reflection by employing concave mirrors. U.S. Pat. No. 4,459,022, Morey (Jul. 10, 1984), discloses an apparatus that includes a concave mirror coupled with optical fibers. Morey's device uses optical fibers as position detecting elements in an electrically passive detecting head. Morey discloses an embodiment wherein a concave mirror is permanently and fixedly mounted onto a movable handle. An optical fiber directs a light beam at the concave mirror, and a plurality of output optical fibers receives portions of the light beam after reflection from the concave mirror. The reflection of the light beam from the concave mirror to the output optical fiber is affected as a user moves the handle while changing the handle position. Observing the portions of the reflected light beam as transmitted through the plurality of output optical fibers are used to determine the position of the handle at the moment of reflection of the light beam from the concave mirror.

U.S. Pat. No. 6,031,946, Bergmann (Feb. 29, 2000), discloses an optical switch having two optical fibers, a concave mirror, a mirror actuator, and a mechanical actuating member attached to the mirror and to the actuator. The actuating member drives the mirror from one preset, discrete position, to another preset position, wherein each discrete mirror position provides a prespecified degree of attenuation of transmission of an optical beam from one optical fiber to another optical fiber.

There is a long felt need to improve the devices and techniques of variable optical attenuation wherein attenuation can be accomplished with more elegance and flexibility than provided in the prior art.

OBJECTS OF THE INVENTION

It is an object of the present invention to provide a variable optical attenuator, or VOA, coupled with a substrate.

It is an object of certain preferred embodiments of the present invention to provide a MEMS-based VOA.

It is another object of certain alternate preferred embodiments of the present invention to provide a variable optical attenuator, or VOA, integrated on a substrate.

It is a still alternate object of certain preferred embodiments of the present invention to provide a VOA that includes a focusing mirror.

It is yet another object of certain preferred embodiments of the present invention to provide a MEMS-based device that comprise or partially comprises a VOA.

It is still another object of certain preferred embodiments of the present invention to provide an array of MEMS-based devices that comprise or partially comprise a multi-channel MEMS-based VOA.

SUMMARY OF THE INVENTION

The method of the present invention provides a VOA for attenuating an optical signal where the optical signal is transmitted at least partially via a light beam. In a first preferred embodiment of the present invention, or an invented VOA, a movable focusing mirror of the invented VOA is positioned by an actuator to reflect, focus and steer the light beam toward a receiving photonic component. The movable focusing mirror steers and controllably misaligns the light beam onto a receiving face of the photonic device. The controlled misalignment of the light beam onto the receiving face enables an attenuation of the optical signal by allowing only a portion of the reflected light beam to enter the photonic component for transmission.

The movable focusing mirror may be a concave mirror, a diffractive mirror, a diffractive concave mirror, a Fresnel mirror, a Zone plate mirror, or another suitable movable focusing mirror known in the art.

The actuator may be or comprise, in various alternate preferred embodiments of the present invention, a suitable actuating element known in the art, to include an electro-mechanical actuator, an electro-static actuator, a piezo-electric actuator, a thermo-mechanical actuator, an electro-magnetic actuator, and a polymer actuator. Where the actuator comprises a polymer actuator, the polymer actuator may be or comprise an electro-active polymer actuator, an optical-active polymer, a chemically active polymer actuator, a magneto-active polymer actuator, an acousto-active polymer actuator, a thermally active polymer actuator or another suitable polymer actuator known in the art.

A photonic component as defined herein includes mirrors, prisms, wave guides, optical fibers, lenses, collimators, and other suitable photonic and optical devices and elements known in the art. A lens as defined herein includes a suitable optical lens, spherical lens, aspherical lens, ball lens, GRIN lens, C-lens and lens system. A wave guide as defined herein includes suitable optical fibers, planar wave guides, photonic crystal wave guides, and other suitable channels for optical signal and light energy transmission known in the art.

In the invented VOA the light beam strikes the receiving photonic device as reflected, focused and steered by the movable focusing mirror upon the receiving surface of the photonic component. The movable focusing mirror, the actuator, and optionally the receiving photonic component are fabricated upon and/or with a substrate.

The pathway defined by the movement of a center of a strike circle of the light beam upon the receiving surface is a trajectory of the light beam. In various preferred embodiments of the present invention the trajectory may comprise a shape of at least one dimension or of at least two dimensions.

The movable focusing mirror, the actuator, and the receiving photonic component of the first preferred embodiment of the present invention are coupled to the substrate. In certain various preferred embodiment, the substrate may be or comprise a single substrate element or two or more mutually coupled substrate elements. The substrate elements are bonded, or adhered, or coupled in another suitable coupling technique known in the art.

In certain various preferred embodiments of the present invention the movable focusing mirror, the actuator, and the receiving photonic component of the invented VOA are integrated upon or within a substrate, and fabricated on the substrate. The substrate may be or comprise suitable substrate materials known in the art, to include semiconductor material, glass, silica, ceramic, metal, metal alloy, and polymer. The semiconductor material may be or comprise suitable semiconductor substrate materials, to include Silicon, Silicon Carbide, Gallium Arsenide, Gallium Nitride, and Indium Phosphide.

A second preferred embodiment is a MEMS-based VOA device, or MEMS VOA, having a substrate, a movable focusing mirror, an actuator, an input wave guide and an output wave guide. The MEMS VOA is, wholly or partially, integrated upon and/or within the substrate, and fabricated on the substrate and wholly or partially comprised as a MEMS. The wave guides have endfaces that are substantially planar and approximately parallel to a planar surface or element of the substrate. A transmission axis of each wave guide may approach its respective endface at an angle θ. The angle θ is the angle formed between the vector of the transmission axis at the endface and a plane, where the plane is parallel to the planar surface of the substrate. The angle θ is measured at the intersection of the transmission axis and the plane. The angle θ is approximately within the range of 45 degrees to 90 degrees, or more optimally within a range of 75 degrees to 90 degrees.

In both the first preferred embodiment and the MEMS VOA, the actuator moves the mirror in an analog fashion relating to a control, power or actuating signal, whereby the movable focusing mirror is positionable within a linear range of motion. The first and second preferred embodiments thereby provide better resolution of attenuation than prior art systems that offer two or more discrete, pre-set positions with a range of motion.

The preferred method of the present invention includes providing a movable focusing mirror, a light beam, and a photonic component. The light beam strikes the movable focusing mirror. The movable focusing mirror reflects, focuses and steers the light beam to strike the photonic component. The mirror controllably forms a trajectory on the photonic component by moving and thereby steering the light beam to move across the photonic component. The position of the mirror thereby determines the portion of the light beam absorbed by the photonic component.

Certain alternate preferred embodiments of the method of the present invention further provide a multi-channel VOA array having a plurality of MEMS-based VOA's fabricated on a common substrate, where each MEMS-based VOA includes a movable focusing mirror. The array accepts a plurality of optical signal inputs via a plurality of input optical fibers and positions the focusing mirror to steer each optical signal received towards or away from at least one output optical fiber.

The above summary of the present invention is not intended to describe each illustrated embodiment or every implementation of the present invention. The figures and the detailed description which follow more particularly exemplify these embodiments. Other objects, features, and advantages of the present invention will be apparent from the accompanying drawings and from the detailed description which follows below. The invention will now be elucidated in more detail with reference to certain non-limitative examples of embodiment shown in the attached drawing figures.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF A PREFERRED EMBODIMENT

While the description above provides a full and complete disclosure of the preferred embodiments of the present invention, various modifications, alternate constructions, and equivalents will be obvious to those with skill in the art. Thus the scope of the present invention is limited solely by the appended claims.

Figure 1:
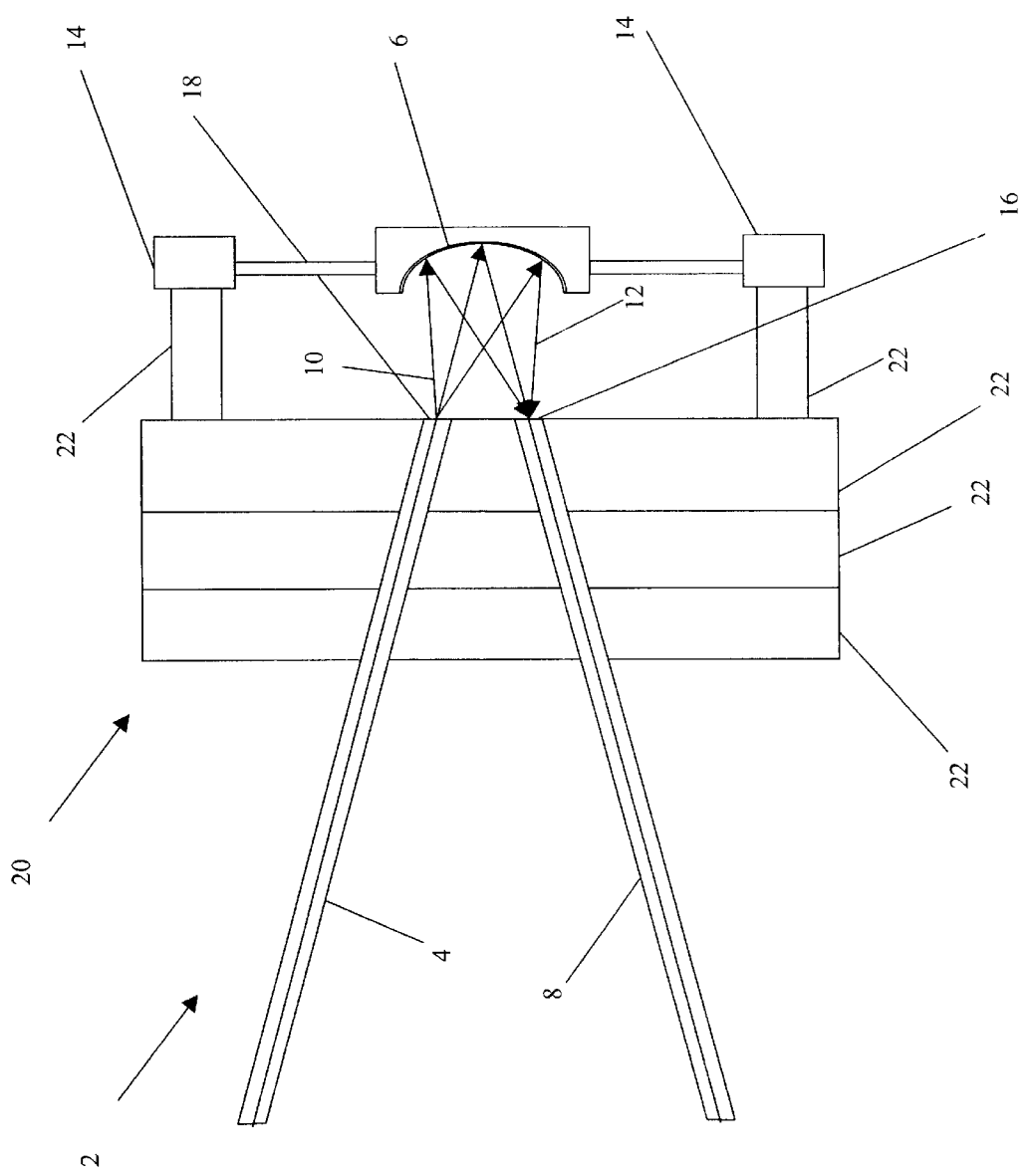
FIG. 1 is a first preferred embodiment of the present invention.

Referring now generally to the Figures and particularly to FIG. 1, a first preferred embodiment of the present invention, or invented VOA 2 includes an input photonic component 4, a movable focusing mirror 6, and an output photonic component 8. A light beam 10 exits the input photonic component 4 and travels toward the focusing mirror 6. The focusing mirror 6 reflects and focuses the light beam 10 into a reflected and focused light beam 12. Two or a plurality of electrostatic mirror actuators 14, or actuators 14, actuate the focusing mirror 6 in at least one dimension. The movable focusing mirror 6, or focusing mirror 6, steers the reflected and focused light beam 12 to form a trajectory 16 on a receiving face 18 of the output photonic component 8 as the mirror actuators 14 drive the focusing mirror 6 in at least one dimension.

The movable focusing mirror 6 may be or comprise, in various preferred embodiments of the present invention, a concave mirror, a diffractive mirror, a diffractive concave mirror, a Fresnel mirror, a Zone plate mirror, or another suitable movable focusing mirror known in the art.

The input photonic component 4 and the output photonic component 8 may each be or comprise, in various preferred embodiments of the present invention, a wave guide, a planar wave guide, an optical fiber, an optical lens, a spherical lens, an aspherical lens, a ball lens, a GRIN lens, a C-lens, a lens system, a prism, a mirror or a collimator, or another suitable photonic component for transmitting and/or receiving the light beam.

The mirror actuators 14 may, in various preferred embodiments of the present invention, actuate the focusing mirror in one, two, or more dimensions. In addition, the mirror actuators 14 of the invented VOA 2 may each be or comprise, in various alternate preferred embodiments of the present invention, an actuator selected from the group consisting of an electro-mechanical actuator, an electro-static actuator, a piezo-electric actuator, a thermo-mechanical actuator, an electromagnetic actuator, and a polymer actuator. Where a mirror actuator 14 comprises a polymer actuator, the mirror actuator 14 may be or comprise an actuator selected from the group consisting of an electro-active polymer actuator, an optical-active polymer, a chemically active polymer actuator, a magneto-active polymer actuator, an acousto-active polymer actuator and a thermally active polymer actuator.

The focusing mirror 6 and the mirror actuators 14 are integrated onto a substrate 20. The substrate 20 and one or more substrate elements 22 may each be or comprise a wafer. The substrate 20 and the substrate elements 22 may comprise suitable materials known in the art, such as a single wafer of glass or semiconductor material. The substrate 20 may be or comprise, in certain alternate preferred embodiments of the present invention, two or a plurality of coupled substrate elements 22. The substrate elements 22 may be individual wafers and may be bonded, adhered, or otherwise coupled with a suitable coupling technique known in the art.

In certain various preferred embodiments of the present invention the substrate 20 and substrate elements 22 may be or comprise suitable substrate materials known in the art, to include semiconductor material, glass, silica, ceramic, metal, metal alloy, and polymer. The semiconductor material may be or comprise suitable substrate materials, to include Silicon, Silicon Carbide, Gallium Arsenide, Gallium Nitride, and Indium Phosphide.

Figure 2:
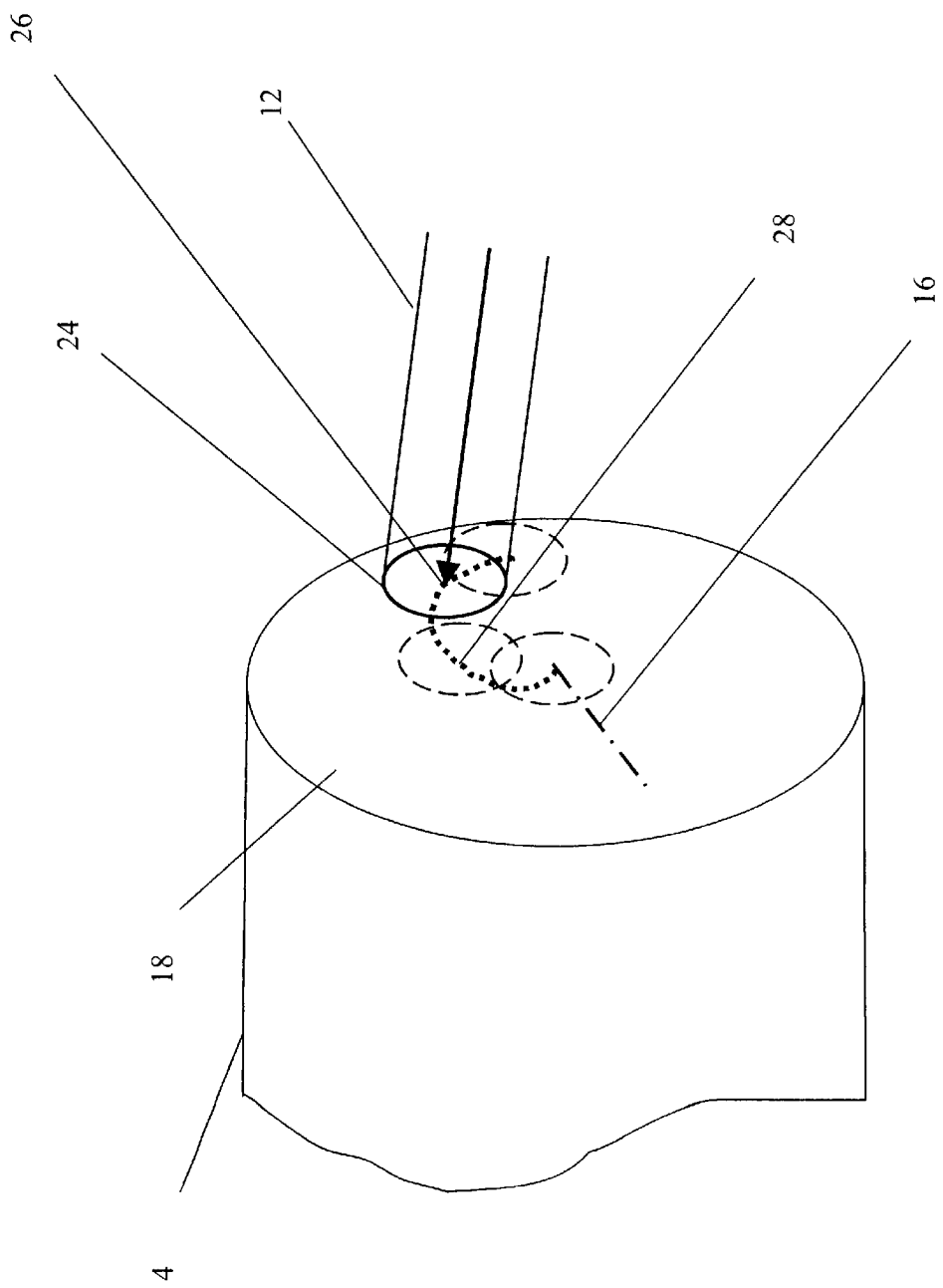
FIG. 2 is a receiving face of an output wave guide of FIG. 1.

Referring now generally to the Figures and particularly to FIG. 2, the reflected and focused light beam 12 strikes the receiving face 18 at a strike circle 24, or spot 24. A center 26 of the spot 24 defines the one dimensional trajectory 16 as the spot 24 moves over receiving face 18. Additionally or alternatively, mirror actuators 14 may drive the focusing mirror 6 in at least two dimensions to steer the reflected and focused light beam 12 to form a two dimensional trajectory 28 on the receiving face 18 of the output photonic component 8 and the focusing mirror 6. The mirror actuators 14 position the focusing mirror 6 in, one, two or more dimensions and thereby drives the center 22 of the spot 22 of reflected and focused light beam 12 along either the one dimensional trajectory 16 or the two dimensional trajectory 28.

Figure 3A:
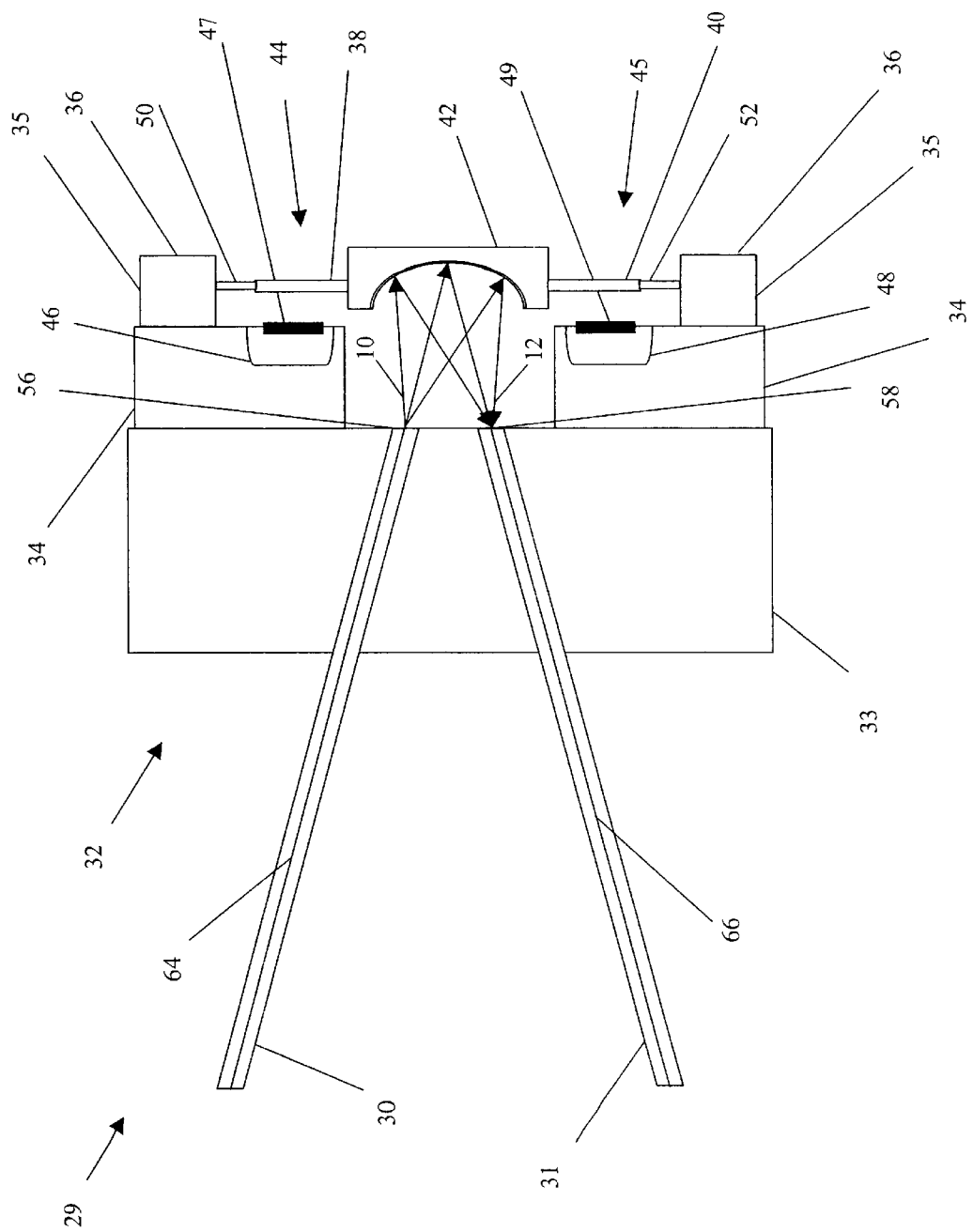
FIG. 3A is a MEMS-based VOA designed in accordance with the method of the present invention shown in an equilibrium or initial position.
Figure 3B:
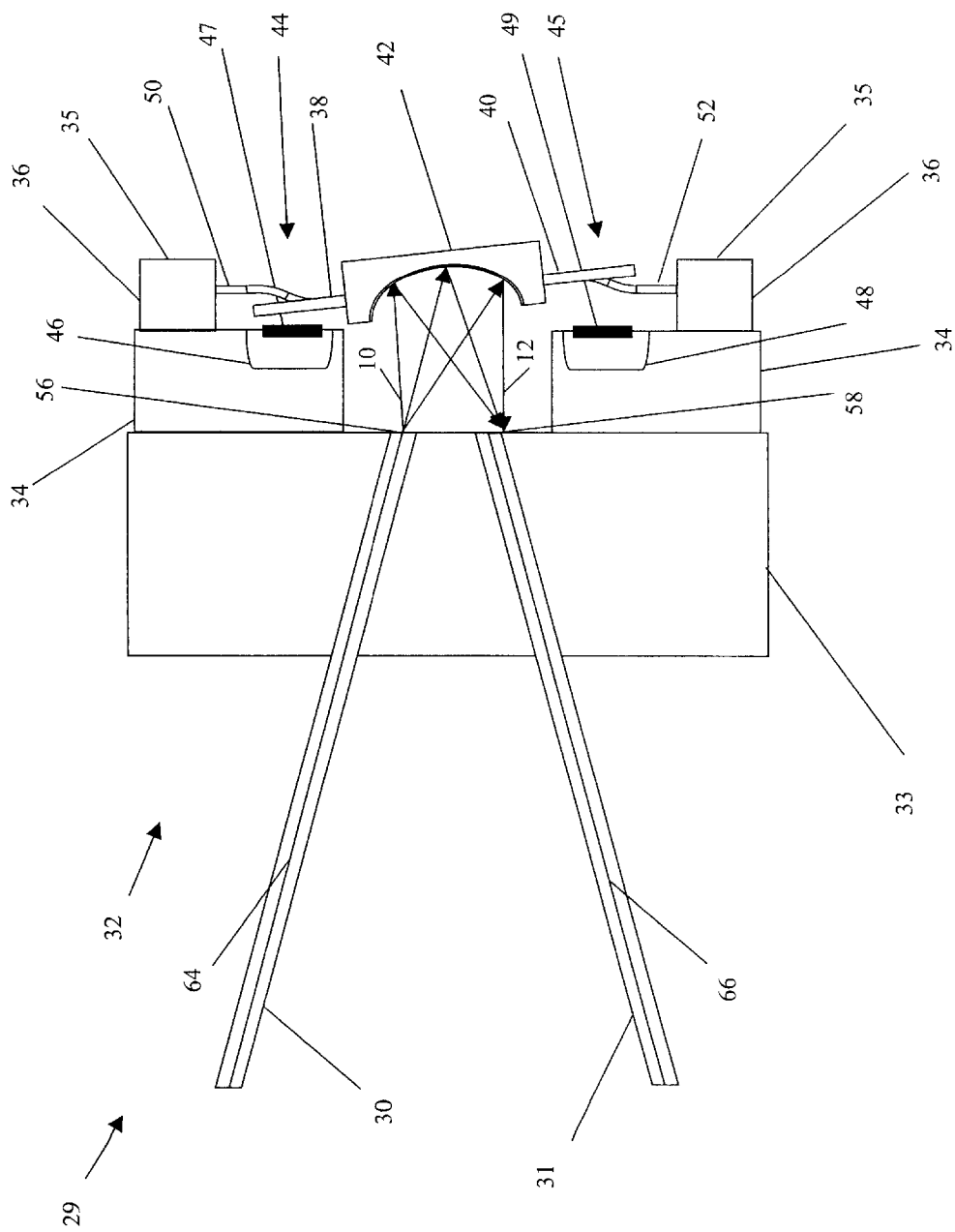
FIG. 3B is the MEMS-based VOA of FIG. 3B shown in an actuated position.

Referring now generally to the Figures and particularly to FIGS. 3A and 3B, a MEMS mirror VOA 29 is a MEMS-based device 29 designed and implemented according to the method of the present invention. The MEMS mirror VOA 29 has an input optical fiber 30, an output optical fiber 31 and a substrate 32. Substrate 32 comprises a first substrate element 33, bonded to a second substrate element 34. The substrate 32 further includes a third substrate element 35 bonded to the second substrate element 34. The substrate elements 33, 34, & 35 can each be wafers and/or made from a suitable semiconductor material by means of a suitable MEMS micro-machining process known in the art. The third substrate element 35 includes a frame 36 and a first movable electrode plate 38 and a second movable electrode plate 40. The MEMS mirror VOA 29 may further comprises one or more additional electrode plates 38 & 40 that enable the MEMS mirror VOA 29 to actuate the focusing mirror 6 in two or three dimensions and/or within as many as all six degrees of freedom of motion.

A concave mirror 42 is preferably a micro-mirror located in the central area between the first and second movable electrode plates 38 & 40, or first and second movable structures 38 & 40. The movable electrode plates 38 and 40 are affixed to or comprised by the concave mirror 42. A first electrostatic actuator 44 and a second electrostatic actuator 45 are formed in the substrate 32. The first electrostatic actuator 44 comprises a first actuator driver 46, a first fixed electrode plate 47 and the first movable electrode plate 38. The second electrostatic actuator 45 comprises a second actuator driver 48, a second fixed electrode plate 49 and the second movable electrode plate 40. The actuator design of the first and second actuators 44 & 45 enables the controlled movement of movable electrode plates 38 and 40 by controlling the electrical state of the fixed electrode plates 47 and 49 via the drivers 46 & 48. Concave mirror 42 moves together with the first and second movable electrode plates 38 and 40. FIG. 3A shows first and second movable electrode plates 38 & 40 and concave mirror 42 in an equilibrium position when no force is applied to the first and second movable electrode plates 38 & 40 by the fixed electrode plates. FIG. 3B illustrates the position of the first and second movable electrode plates 38 & 40 and concave mirror 42 in an actuated position. As can be seen from FIGS. 3A and 3B, changing the angular position of movable electrode plates 38 or 40 changes the angular position of concave mirror 42 and the direction of the light beam 12. Therefore light beam 12 can be spatially redirected by the interaction of the first and second fixed electrode plates 47 & 49 with the movable electrode plates 38 & 40.

Frame 36 is coupled with movable electrode plates 38 and 40 by suspensions 50 and 52. Suspensions 50 and 52 are strong enough to withstand mechanical forces applied to movable parts 38 and 40 during wafer processing, including wafer separation and die handling. Suspensions 50 and 52 are flexible enough to provide angular deflection of the movable electrode plates 38 and 40 by the force applied by the first and second actuators 44 & 45. Suspensions 50 and 52 also provide electrical and/or magnetic and/or thermal connection of movable parts 38 and 40 with frame 36.

The MEMS mirror VOA 29 may alternatively or additionally include thermo-mechanical or bi-metallic actuators. Thermo-mechanical actuators can achieve larger forces and deflections compared to electrostatic and electromagnetic actuators. Where MEMS mirror VOA 29 includes thermo-mechanical actuators, the MEMS mirror VOA 29 may contain a heater (not shown) that heats at least a portion of the suspensions 50 and 52. This heating causes stresses in suspensions 50 and 52 that in turn cause angular displacement of movable electrode plates 38 and 40, whereby the concave mirror 42 is also angularly displaced.

There are several options for the heater or a heating structure. In a multi-level structure, the heating can be accomplished by imposing an electric current through a metal layer or a silicon layer, or both. The heater may be electrically and thermally coupled with the substrate 32. If the actuators 44 and 45 comprise thermo-mechanical bimetallic actuators an electrical connection with the substrate 32 can provide the necessary electrical current to the heater. A thermal connection between can provide a sufficient thermal resistance to both create the necessary temperature gradient across suspensions 50 and 52, yet be small enough to prevent overheating of the first and second movable structures 38 & 40.

Where MEMS mirror VOA 29 includes piezoelectric actuators, a piezoelectric material (not shown) can be applied to the top of the third substrate element 35 in suspensions 50 and 52. A voltage applied to the piezoelectric material changes the linear dimensions of the piezoelectric material, whereby suspensions 50 and 52 are bent and movable structures 38 and 40 are deflected. The concave mirror 42 will therefore be angularly displaced as the suspensions 50 and 52 are bent. A coupling of the actuators 44 & 45 with the substrate 32 provides for a pathway to deliver controlling voltages to the piezoelectric material.

The MEMS mirror VOA 29 is integrated and is wholly or partially comprised as a micro-electro-mechanical system. The concave mirror 42, the electrostatic actuators 44 and 45 and the substrate 32 are coupled with each other and integrated together. The input optical fiber 30 and an output optical fiber 31 are coupled with the substrate 32. The input optical fiber 30 has an input endface 56 and the output optical fiber 31 has a receiving endface 58.

The electrostatic actuators 44 & 45 actuate the mirror 42 in at least two dimensions and the suspensions 50 and 52 provide a restoring force to return the mirror 42 to an initial position when the mirror 42 is actuated out of the initial position of FIG. 3A. The electrostatic actuators 44 and 45 move the mirror 42 in an analog or approximately proportional fashion relating to a control, power or actuating signal, whereby the mirror 42 is at any point within a range of motion. The MEMS mirror VOA 29 thereby provides better selectability of attenuation than prior art systems that offer two or more discrete, pre set positions with a range of motion.

Referring now generally to the Figures, a preferred method of the present invention includes providing the concave mirror 42, the light beam 10, and the output optical fiber 31. The light beam 10 strikes the concave mirror 42. The actuators 44 & 45 move the concave mirror 42 to steer the reflected light beam 12 to strike the receiving endface 58 of the output optical fiber 31. The concave mirror 42 controllably forms the two dimensional trajectory 28 on the output optical fiber 31 by moving and thereby steering the light beam 12 to move across the receiving endface 58.

Figure 4:
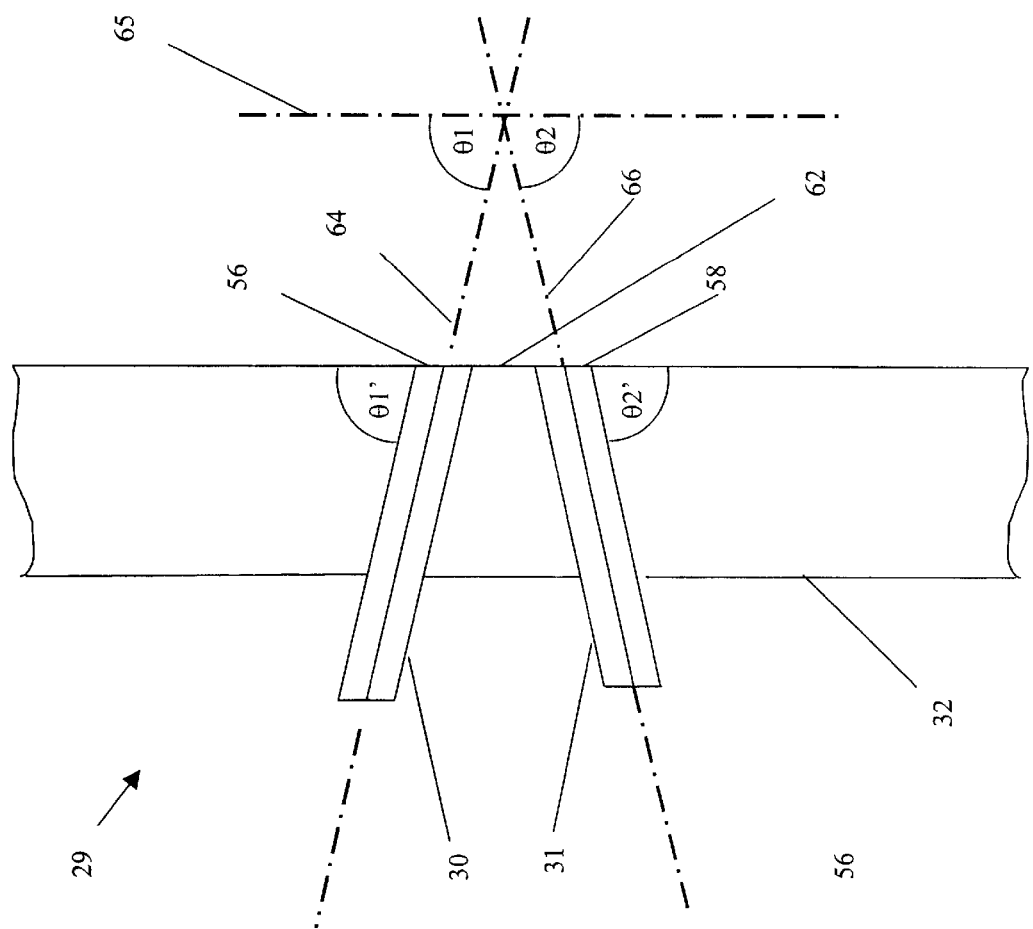
FIG. 4 is close view of an endface of an optical fiber of the MEMS-based VOA of FIG. 3A.

Referring now generally to the Figures and particularly to FIG. 4, FIG. 4 is a close view of the input endface 56 of the input optical fiber 30 and the output receiving endface 58 of the output optical fiber 31 of the MEMS-based device 30 of FIG. 3. The input endface 56 and the receiving endface 58 are both substantially planar and are substantially parallel to a planar surface 62 of the substrate 32. An input transmission axis 64 internal to the input optical fiber 43 terminates at the input endface 56 wherefrom the light beam 10 exits the input optical fiber 43. An angle $\theta'$ is defined as the angle between the input transmission axis 64 at and the planar surface 62 at the input endface 56. The input transmission axis 64 ends at the input endface 56 at the angle $\theta'$ selected from a range of angles from approximately 45 degrees to 90 degrees, or more optimally from a range of angles from approximately 75 degrees to 90 degrees. The light beam 10, as shown in FIG. 1, changes direction after leaving the input endface 56 due to refraction. This refraction causes a difference between the angle $\theta1'$ and an angle $\theta1$. The angle $\theta1$ is equal to the angle of intersection between the light beam 10 and a plane 65, where the plane 65 is parallel with the input endface 56 and the receiving endface 58. As $\theta1'$ increases towards 90 degrees, the difference between $\theta1'$ and $\theta1$ decreases.

An output transmission axis 66 internal to the output optical fiber 54 terminates at the output receiving endface 58. The reflected and focused light beam 12 of FIG. 1 partially or wholly enters the output optical fiber 31 via the output receiving endface 58. The output transmission axis 66 leads from the output receiving endface 58 at an angle $\theta2'$ selected from a range of angles from approximately 45 degrees to 90 degrees, or more optimally from a range of angles from approximately 75 degrees to 90 degrees. The reflected light beam 12, as shown in FIG. 1, reflects from the focusing mirror 6 an angle $\theta2$, where $\theta2$ is equal to the intersection angle between the reflected light beam 12 and the plane 65. The angled orientation of the optical fibers 30 and 31 and of their respective endfaces 56 and 58, in relation to the mirror 42, reduces an operating range of motion required by the mirror 42 to provide a desired range of attenuation. The angle $\theta2$ is equal to the angle of intersection between the output transmission axis 66 and the plane 65. The refraction of the light beam 10 that causes a difference between the angle $\theta1'$ and an angle $\theta1$ also contributes to a difference between $\theta2$ and $\theta2'$. The difference between $\theta2$ and $\theta2'$ contributed by the refraction occurring at input endface 56 similarly decreases as $\theta1'$ approaches 90 degrees. It is understood that the value of $\theta2$ is also affected by the position of the focusing mirror 6, whereas the constant value of angle $\theta2'$ is determined by the orientation of the output fiber 31 and the planar surface 62.

Figure 5:
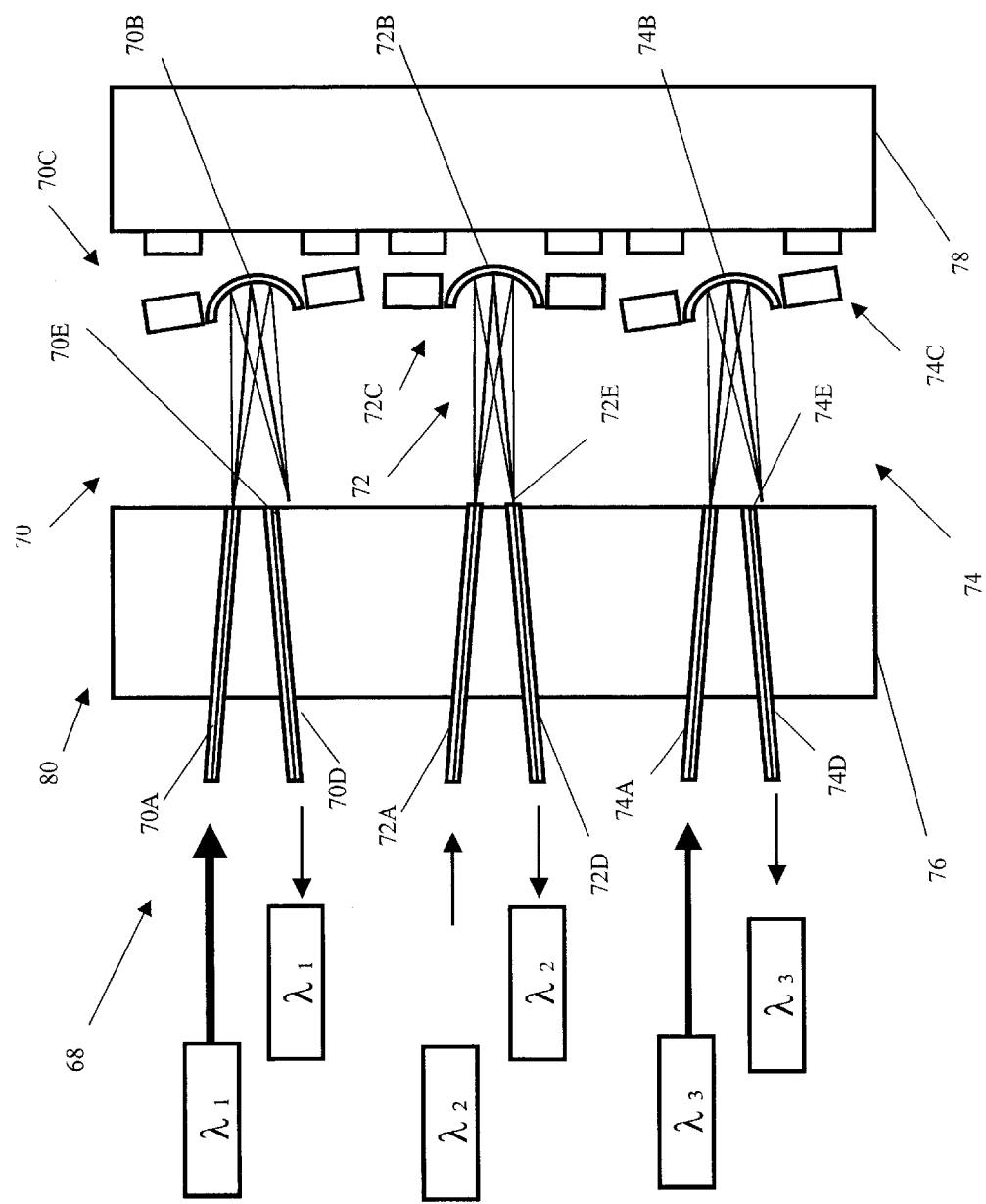
FIG. 5 is an array of MEMS-based VOA's designed and used in accordance with the method of the present invention.

It is further understood that the endfaces 44 and 46 are not, in certain alternate preferred embodiments of the present invention, co-planar, i.e. oriented within or approximately at a single plane. The endfaces 56 and 58, for example, are raised above the substrate planar surface 62 and closer to the concave mirror 42 in certain alternate preferred embodiments of the present invention Referring now generally to the Figures and particularly to FIG. 5, a MEMS VOA array 68 includes a plurality of MEMS-based VOA's 70, 72 and 74, or MEMS VOA 70, 72 and 74. Each MEMS VOA 70, 72, and 74 has an input optical fiber 70A, 72A and 74A, a concave mirror 70B, 72B and 74B, an actuator 70C, 72C, and 74C and an output optical fiber 70D, 72D and 74D. The optical fibers 70A, 72A, 74A, 70D, 72D and 74D are coupled with a first substrate element 76 and the concave mirrors are rotatably coupled to a second substrate element 78. The first substrate element 76 and the second substrate element 78 are comprised within substrate 80 bonded, or adhered, or coupled by another suitable coupling means known in the art. A light beam $\lambda1$ passes through input optical fiber 70A and strikes mirror 70B. Mirror 70B steers light beam $\lambda1$ away from the best alignment with a receiving face 70E of output optical fiber 70D, whereby only a small fraction of light beam $\lambda1$ passes into the output optical fiber 70D through the receiving face 70E. Any optical signal being transmitted via light beam $\lambda1$ is thereby significantly attenuated by MEMS VOA 70.

Referring now to MEMS VOA 72, a light beam $\lambda2$ passes through input optical fiber 72A and strikes mirror 72B. Mirror 72B steers and focuses light beam $\lambda2$ directly at a receiving face 72E of the output optical fiber 72D, whereby a large percentage of light beam $\lambda2$ passes into the receiving face 72E. Any optical signal being transmitted via light beam $\lambda2$ is thereby not significantly attenuated by MEMS VOA 72.

Referring now to MEMS VOA 74, a light beam $\lambda3$ passes through input optical fiber 74A and strikes mirror 74B. Mirror 74B steers and focuses light beam $\lambda3$ at a point within VOA 74 that is between (1) the analogous position to which $\lambda1$ is being steered to in VOA 70, and (2) the analogous position to which $\lambda2$ is being steered to in VOA 72. A larger percentage of light beam $\lambda3$ passes into a receiving face 74E than receiving face 70E is receiving of $\lambda1$. But a smaller percentage of light beam $\lambda3$ passes into the output fiber 74D than the input fiber 72D is receiving of $\lambda2$. Any optical signal being transmitted via light beam $\lambda3$ is thereby attenuated by MEMS VOA 74 at a level of attenuation intermediate between the attenuation of $\lambda1$ by MEMS VOA 70 and of $\lambda2$ by MEMS VOA 72.

The advantages of the MEMS VOA array 68 over singly packaged VOA's include cost reductions in packaging expenses on a per VOA basis. Further cost reductions are achieved in eliminating individual component optical alignment steps.

The present invention has been described in conjunction with the preferred embodiments. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense. As noted above, the present invention is applicable to the use, operation, structure and fabrication of a number of different VOA's. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications, devices and methods.

I claim:

1. A MEMS VOA for attenuating an optical signal, the optical signal transmitted via a light beam, and the MEMS VOA comprising:

a substrate;

a movable focusing mirror, the movable focusing mirror coupled with the substrate, and the movable focusing mirror for reflecting, focusing and steering the light beam in a trajectory;

an actuator, the actuator coupled with the substrate, and the actuator operatively coupled with the movable focusing mirror, the actuator for actuating the movable focusing mirror;

an input photonic component, the input photonic component coupled with the substrate, and the light beam emitting from the input photonic component and toward the movable focusing mirror; and an output photonic component, the output photonic component coupled with the substrate and positioned to receive at least part of the light beam reflected from the movable focusing mirror when the light beam is steered towards the output photonic component.

2. The MEMS VOA of claim 1, wherein the substrate comprises at least two substrate elements.

3. The MEMS VOA of claim 1, wherein the substrate comprises a plurality of substrate elements.

4. The MEMS VOA of claim 1, wherein the substrate is selected from the group consisting of semiconductor material, glass, silica, ceramic material, metal, metal alloy, and polymer.

5. The MEMS VOA of claim 4, wherein the semiconductor material is selected from the group consisting of Silicon, Silicon Carbide, Gallium Arsenide, Gallium Nitride, and Indium Phosphide.

6. The MEMS VOA of claim 1, wherein the movable focusing mirror is selected from the group consisting of a Fresnel mirror, a Zone plate mirror, a concave mirror, a diffractive mirror, and a diffractive concave mirror.

7. The MEMS VOA of claim 1, wherein the actuator is selected from the group consisting of an electro-mechanical actuator, an electro-static actuator, a piezo-electric actuator, a thermo-mechanical actuator, an electromagnetic actuator, and a polymer actuator.

8. The MEMS VOA of claim 7, wherein the polymer actuator is selected from the group consisting of an electro-active polymer actuator, an optical-active polymer, a chemically active polymer actuator, a magneto-active polymer actuator, an acousto-active polymer actuator and a thermally active polymer actuator.

9. The MEMS VOA of claim 1, wherein the output photonic component is selected from the group consisting of a wave guide, a planar wave guide, an optical fiber, an optical lens, a spherical lens, an aspherical lens, a ball lens, a GRIN lens, a C-lens, a lens system, a prism, a collimator, a mirror, a Fresnel mirror, a Zone plate mirror, a concave mirror, a diffractive mirror, and a diffractive concave mirror.

10. The MEMS VOA of claim 1, wherein the input photonic component is selected from the group consisting of a wave guide, a planar wave guide, an optical fiber, an optical lens, a spherical lens, an aspherical lens, a ball lens, a GRIN lens, a C-lens, a lens system, a prism, a collimator, a mirror, a Fresnel mirror, a Zone plate mirror, a concave mirror, a diffractive mirror, and a diffractive concave mirror.

11. The MEMS VOA of claim 10, wherein the output photonic component is selected from the group consisting of a wave guide, a planar wave guide, an optical fiber, an optical lens, a spherical lens, an aspherical lens, a ball lens, a GRIN lens, a C-lens, a lens system, a prism, a collimator, a mirror, a Fresnel mirror, a Zone plate mirror, a concave mirror, a diffractive mirror, and a diffractive concave mirror.

12. The MEMS VOA of claim 1, wherein the actuator actuates the mirror in at least one dimension and the movable focusing mirror reflects, focuses and steers the light beam within a trajectory having at least one dimension.

13. The MEMS VOA of claim 1, wherein the actuator actuates the movable focusing mirror in at least two dimensions and the movable focusing mirror reflects, focuses and steers the light beam within a trajectory having at least two dimensions.

14. A MEMS VOA for attenuating an optical signal, the optical signal transmitted via a light beam, and the MEMS VOA comprising:

a substrate;

a movable focusing mirror, the movable focusing mirror coupled with the substrate, and the movable focusing mirror for reflecting, focusing and steering the light beam in a trajectory;

an actuator, the actuator coupled with the substrate, and the actuator operatively coupled with the movable focusing mirror, the actuator for actuating the movable focusing mirror;

an input wave guide, the input wave guide having an input transmission axis and an input endface, and the input wave guide coupled with the substrate, and the light beam emitting along the transmission axis, from the input endface, and toward the movable focusing mirror; and an output wave guide, the output wave guide having an output endface and an output transmission axis, and the output endface positioned to receive at least part of the light beam reflected from the movable focusing mirror when the light beam is steered towards the output wave guide.

15. The MEMS VOA of claim 14, wherein the input endface further comprises an input planar surface that is substantially planar and parallel to a planar surface of the substrate, and the input transmission axis intersects the input planar surface at an angle within a range of 75 degrees to 90 degrees.

16. The MEMS VOA of claim 15, wherein the input wave guide is an optical fiber.

17. The MEMS VOA of claim 14, wherein the input endface further comprises an input planar surface that is substantially planar and parallel to a planar surface of the substrate, and the input transmission axis intersects the input planar surface at an angle within a range of 45 degrees to 90 degrees.

18. The MEMS VOA of claim 14, wherein the output endface further comprises an output planar surface that is substantially planar and parallel to a planar surface of the substrate, and the output transmission axis intersects the output planar surface of the output put endface at an angle within a range of 75 degrees to 90 degrees.

19. The MEMS VOA of claim 18, wherein the input endface further comprises an input planar surface that is substantially planar and parallel to the planar element of the substrate, and the input transmission axis intersects the input planar surface at an angle within a range 75 degrees to 90 degrees.

20. The MEMS VOA of claim 19, wherein the input wave guide and output wave guide are optical fibers.

21. The MEMS VOA of claim 18, wherein the output wave guide is an optical fiber.

22. The MEMS VOA of claim 14, wherein the output endface further comprises an output planar surface that is substantially planar and parallel to a planar surface of the substrate, and the output transmission axis intersects the output planar surface of the output put endface at an angle within a range of 45 degrees to 90 degrees.

23. The MEMS VOA of claim 22, wherein the input endface further comprises an input planar surface that is substantially planar and parallel to the planar element of the substrate, and the input transmission axis intersects the input planar surface at an angle within a range of 45 degrees to 90 degrees.

24. A MEMS VOA array for attenuating optical signals, said optical signals transmitted via a plurality of light beams, and said MEMS VOA array comprising:

a substrate;

a plurality of VOAs, each VOA coupled with said substrate, and each VOA comprising a movable focusing mirror, an actuator, an input optical fiber, and an output optical fiber;

each movable focusing mirror coupled with said substrate, and each said movable focusing mirror for reflecting, focusing and steering a light beam in a trajectory;

each actuator coupled with said substrate, and each said actuator operatively coupled with a movable focusing mirror, each said actuator for actuating said movable focusing mirror;

each input optical fiber coupled with said substrate, and each said input optical fiber positioned to direct the light beam emitted from each said input optical fiber toward a movable focusing mirror; and each output optical fiber coupled with said substrate, and each said output optical fiber positioned to receive at least part of the light beam reflected from and steered by a movable focusing mirror.

* * * * *